United States Patent [19]

Hoff

[11] 4,188,719

[45] Feb. 19, 1980

[54] LAWN TRIMMER CHAIN SAW ATTACHMENT

[75] Inventor: Stephen J. Hoff, Richmond, Ind.

[73] Assignee: Hoffco, Inc., Richmond, Ind.

[21] Appl. No.: 871,603

[22] Filed: Jan. 23, 1978

[51] Int. Cl.² ............... A01D 35/26; A01D 50/00
[52] U.S. Cl. .................................. 30/122; 30/276; 56/12.7
[58] Field of Search ................ 30/122, 276, 500; 172/41; 56/12.7

[56] References Cited

U.S. PATENT DOCUMENTS

| | | | |
|---|---|---|---|
| 2,810,409 | 10/1957 | Ibelle | 30/122 |
| 2,888,994 | 6/1959 | Hoff | 172/41 X |
| 3,291,167 | 12/1966 | Varden | 30/122 |
| 3,977,078 | 8/1976 | Pittinger | 30/276 |
| 4,048,722 | 9/1977 | Howard | 30/122 |
| 4,062,115 | 12/1977 | Lee | 30/276 |

*Primary Examiner*—Jimmy C. Peters
*Attorney, Agent, or Firm*—Jenkins, Coffey, Hyland, Badger & Conard

[57] ABSTRACT

A lawm trimmer chain saw conversion attachment has a mounting blade which mounts to a chain saw power head in place of the chain bar. The blade supports a housing formed of complementary die-cast halves which contains bevel gears between an input shaft that is chain driven at reduced speed from the saw drive sprocket and an output shaft that couples to the flexible drive shaft of a lawn trimmer frame tube. The frame tube is clamped at its upper end between half-sleeves on the housing halves, and carries a rotary cutter head at its lower end. A D-handle on the frame tube cooperates with the saw handle for convenient manipulation and control. The frame tube is rotatably adjustable and the D-handle is both axially and rotatably adjustable to adapt the assembly to the operator's convenience and to the desired operating angle of the cutter head, e.g., for horizontal lawn trimming, angular edging, sweeping, etc. The handle also rotates down to form a stand for starting or operating the engine with the cutter head elevated. The attachment sprocket is protected by housing walls which receive a snap-on plastic cover which projects toward the saw power head and is adapted to be trimmed to fit the configuration of that head.

15 Claims, 10 Drawing Figures

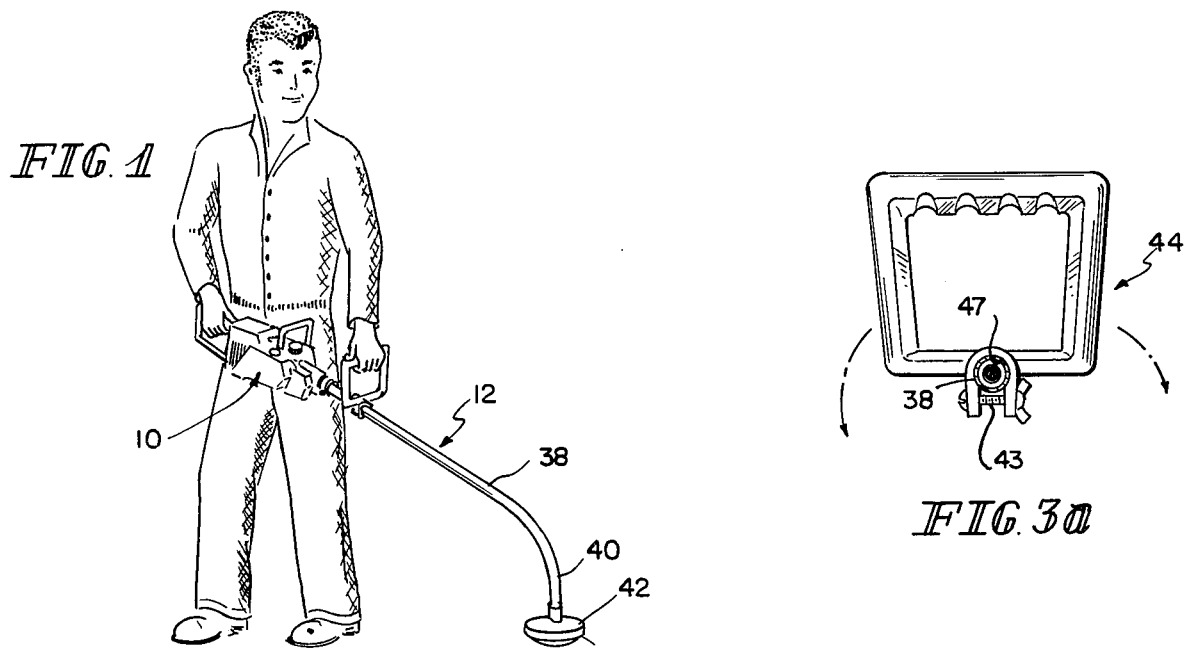
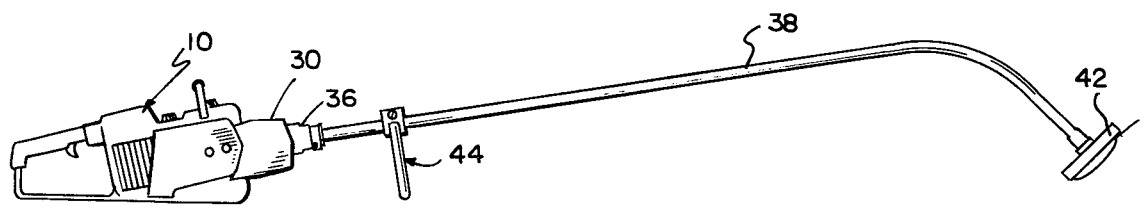
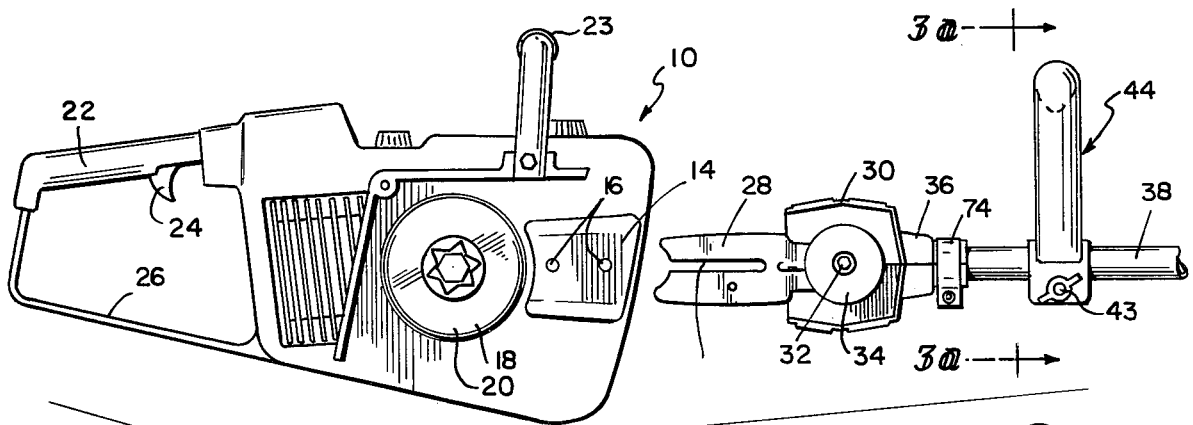
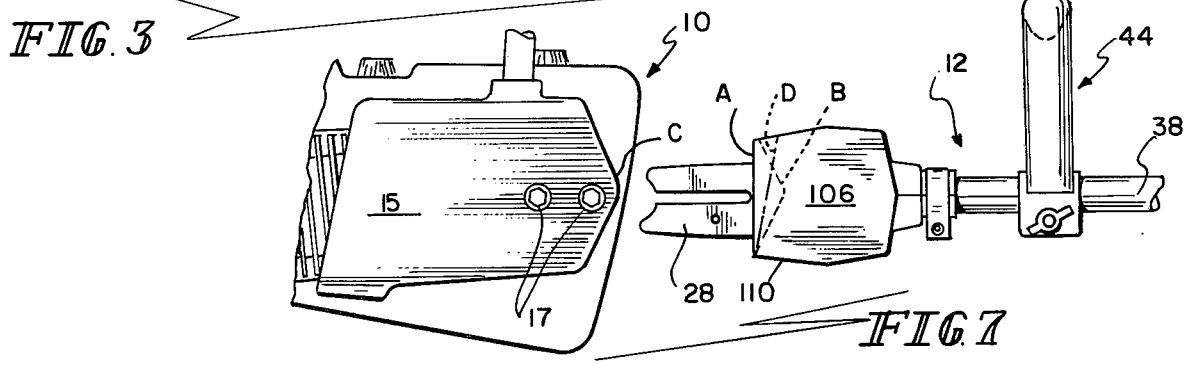

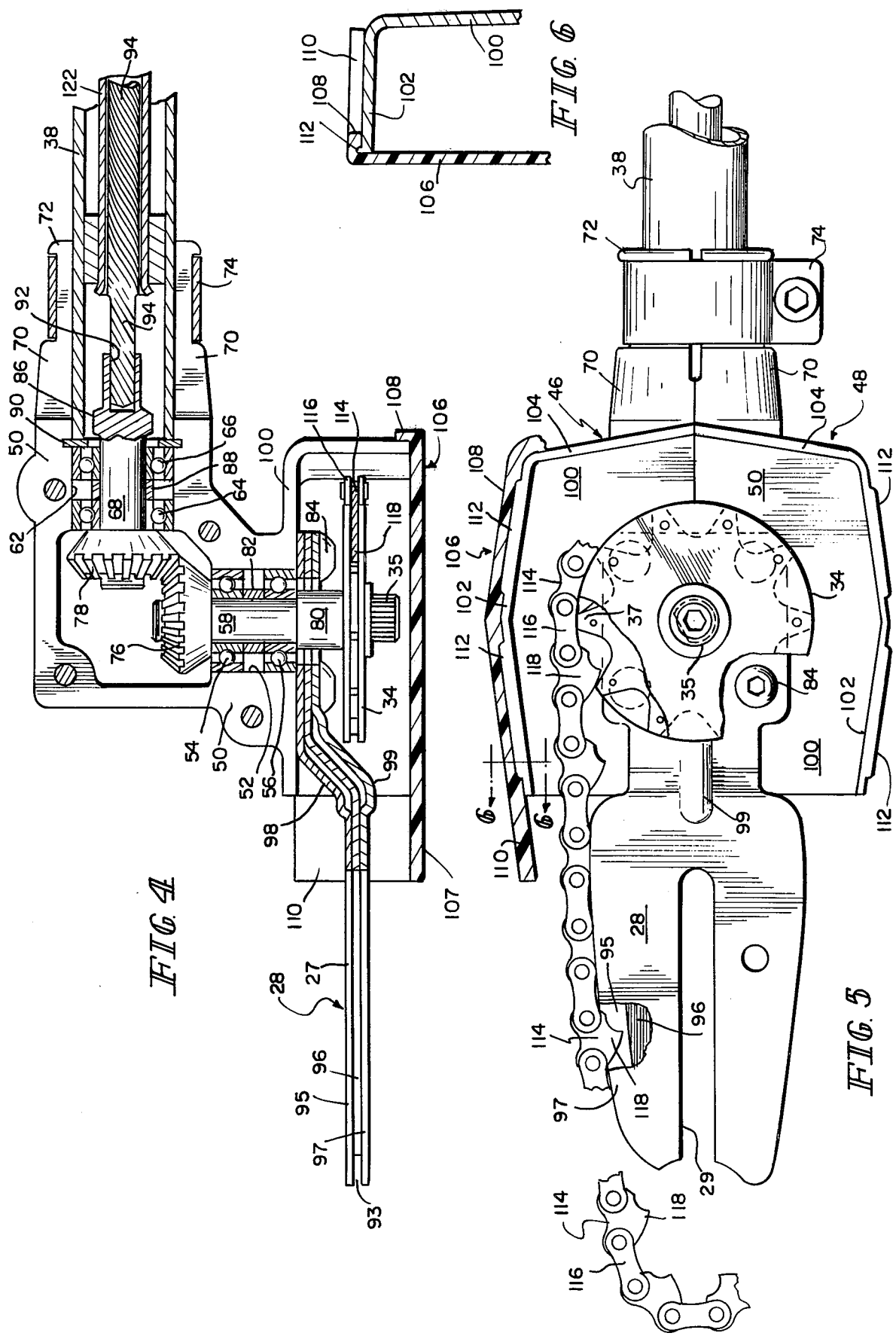

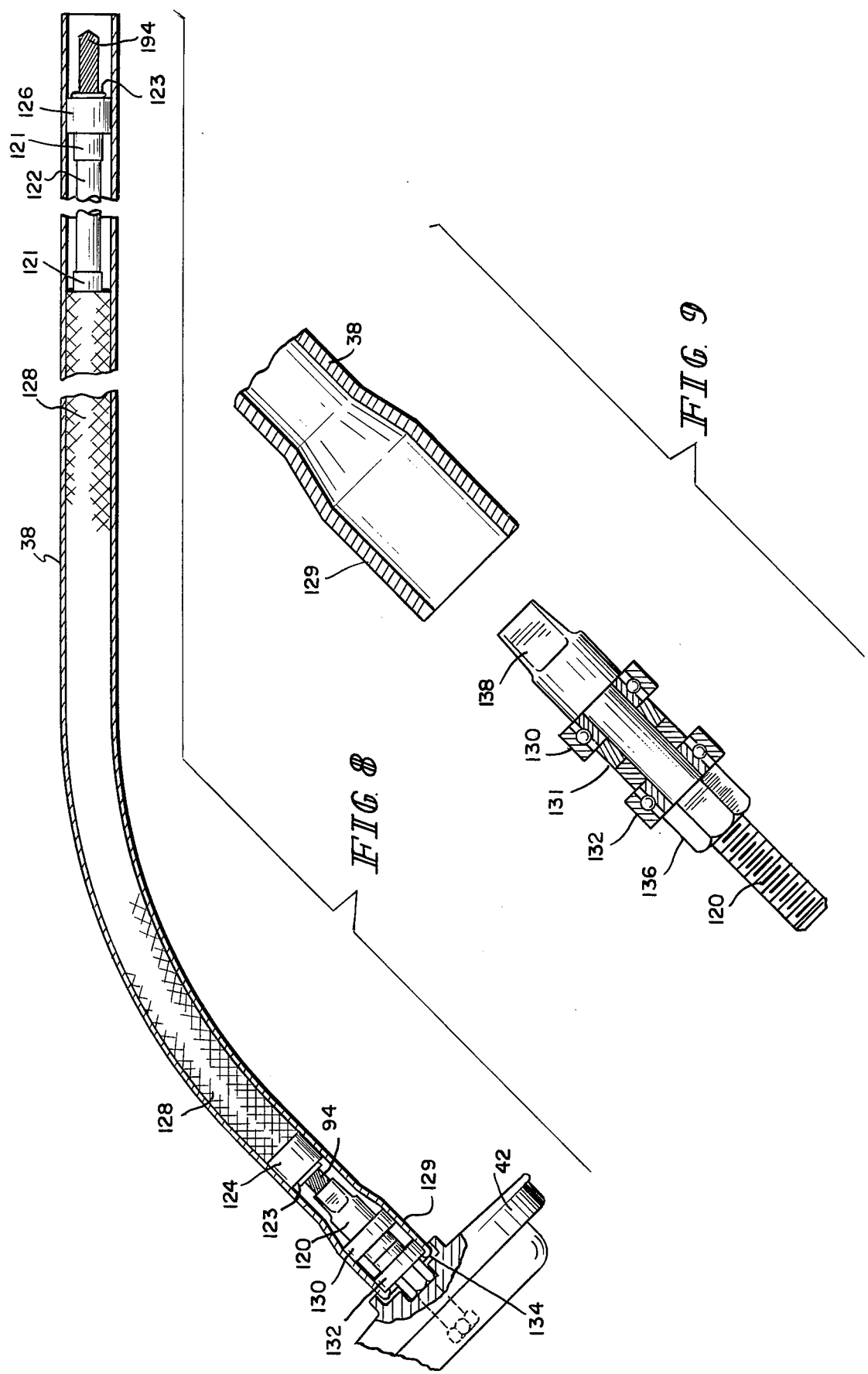

LAWN TRIMMER CHAIN SAW ATTACHMENT

This invention relates to a lawn trimmer, brush cutter, or the like adapted to be attached as a conversion attachment to a chain saw power head to be powered thereby.

There are presently on the market, from various manufacturers, a considerable number of rotary lawn mowers, edgers, and the like in which a rotary cutting or operating head is mounted at the lower end of a tubular frame shaft for operation close to the ground and in which the shaft extends upward and rearward to a carrying position and is attached therebeyond to a power head in the form of a small gasoline engine or electric motor. Such implements are shown, for example, by the Ballas and Geist U.S. Pat. Nos. 3,708,967 of Jan. 9, 1973 and 3,826,068 of July 30, 1974. Other similar manually-carried, self-powered implements have been known for a number of years. These include cultivating implements such as that shown in the H. J. and S. J. Hoff U.S. Pat. No. 2,888,994 of June 2, 1959, and a similar brush cutting and clearing implement which embodied a power head and frame shaft similar to that shown in the Hoff patent but which was fitted with a rotary saw or cutter blade for brush cutting and clearing purposes. All such implements were each individually powered by its own power head, and in the case of the Hoff brush cutter, the cutting blade attached to the lower end of the frame shaft was interchangeable to suit different cutting and clearing operations. The implement was nevertheless a specialized implement requiring its own internal combustion motor.

Meanwhile, there have also been on the market for a number of years, in increasing numbers and from different manufacturers, a variety of lightweight chain saws in which a saw chain is driven about a chain bar by a lightweight gasoline engine, again with each saw requiring its own individual power unit.

It is the object of the present invention to provide a rotary cutting tool or implement of the general type exemplified by the Ballas and Geist lawn trimmer and the Hoff cultivating implement and brush cutter which is adapted to be attached to the power head of a chain saw as a conversion attachment. It is the special object of the invention to provide a lawn trimmer chain saw conversion attachment which will have a rotary head adapted for a variety of lawn maintenance operations, such as trimming, cutting, mowing, edging, sweeping, etc. which will be adapted to be attached to the power head of a lightweight chain saw as a conversion attachment, to form a lightweight combination implement which can be carried in the hands of the operator and will be convenient for use in performing all such lawn and maintenance operations.

In accordance with the invention, a conversion attachment is provided with a mounting blade adapted to be mounted to a chain saw power head in place of the chain bar thereof. Such mounting blade supports a housing, desirably formed of two complementary die-cast halves. The housing has an input sprocket shaft adapted to be chain driven from the chain saw drive sprocket, and has an output shaft, desirably at 90° to the input shaft, which is drivingly connected to the input shaft, as by bevel gears. The housing forms a frame shaft mounting which is coaxial with the output shaft and extends forward in generally the same direction from the chain saw power head as its normal chain-supporting blade. To this is attached, as by clamping, the upper end of the frame shaft of the lawn trimming implement. Such frame shaft extends forward and downward from the housing and rotatably supports at its lower end a rotary cutting head for the lawn trimmer or the like, and such head is drivingly connected to the output shaft of the attachment housing, as by a flexible cable. The frame shaft is preferably tubular, and the flexible drive shaft extends therethrough and is supported therein by a sheath tube held in spaced concentric relation with the frame tube by an intervening bushing. This arrangement permits the rear handle of the chain saw to be used as a handle for the conversion implement. In addition, the frame shaft is desirably provided with a supplemental handle, which with the saw handle provides for convenient manipulation and control of the assembled conversion implement.

The frame shaft is desirably bent or otherwise formed so that the cutter head rotates on an axis at an angle to the axis of the housing output shaft such that the cutter head rotates parallel to the ground while the power head portion of the conversion implement is held in a convenient sloping position at the hip of the operator. Desirably, the frame tube is rotatably adjustable about the axis of the housing output shaft, and the handle on the frame shaft is both axially and rotatably adjustable thereon. These adjustments permit the operator to adjust the handles to suit his convenience, but also permit him to rotate the frame shaft to change the operating angle of the cutter head to suit different operations, for example, from a generally horizontal position for lawn trimming to various angular positions for edging, sweeping, etc. The handle mounted on the frame tube is desirably a D-shaped handle with an elongated upper handhold and is adapted to be rotated from an upstanding primary position to a depending secondary position in which it forms a stand for supporting the implement on a flat surface in a position in which the rotary cutter cutting head will be elevated above such surface, which supported position provides for safe and convenient starting of the chain saw engine.

The driven chain sprocket of the conversion attachment is desirably larger than the output sprocket of the chain saw so as to reduce drive speed. The attachment sprocket is desirably enclosed by housing walls about three sides and covered by a snap-on plastic cover which projects from the attachment walls toward the chain saw power head, and such cover is adapted to be trimmed to fit the configuration of the particular chain saw to which the attachment is mounted.

The accompanying drawings illustrate the invention and show an embodiment exemplifying the best mode of carrying out the invention as presently perceived. In such drawings:

FIG. 1 is a pictorial view showing a preferred embodiment of the invention being manually carried and used by an operator, as for lawn trimming;

FIG. 2 is a side elevation of the embodiment shown in FIG. 1, with the attachment handle rotated 180° to form a stand, and with the implement resting on the ground with its rotary cutting head elevated, for purposes of convenient and safe starting of the engine;

FIG. 3 is an exploded side elevation showing a chain saw power head and a conversion attachment in accordance with the present invention, in position for mounting the latter on the former;

FIG. 3a is a section on the line a—a of FIG. 3, showing the frame shaft handle;

FIG. 4 is a longitudinal sectional view, taken in the plane of separation of the upper and lower halves of the attachment housing, indicated by the line 4—4 in FIG. 5;

FIG. 5 is a front elevation of the assembly shown in FIG. 4, with portions broken away;

FIG. 6 is a fragmental sectional view taken on the lines 6—6 of FIG. 5 and showing the snap-on connection of the sprocket cover to the sprocket housing;

FIG. 7 is a side elevation of the structure shown in FIG. 3, showing the housing cover and how it can be trimmed to fit the chain saw power head;

FIG. 8 is a longitudinal sectional view of the frame shaft and lower end assembly of the embodiment shown in FIGS. 1 and 2; and FIG. 9 is an enlarged exploded view showing the method of mounting the arbor shaft for the cutter head in the lower end of the frame tube.

The conversion assembly shown in the drawings comprises a chain saw power head 10 and a lawn trimmer conversion attachment 12. The chain saw power head 10 has a mounting pad 14 to which the chain saw bar (not shown) is normally attached by a cover plate 15 (FIG. 7) held by nuts 17 on a pair of mounting studs 16. When so mounted, the chain saw bar is coplanar with an output sprocket 18 driven through a clutch 20 from the engine contained in the power head 10. Such head also includes a rear handle 22 with a throttle control trigger 24 mounted below it for operation by the hand grasping the handle 22. A guard 26 extends from the lower rear portion of the power head rearward and upward to the outer end of the handle 22, and forms a base for supporting the rear end of the power head. The power head normally also has a front handle 23.

The conversion attachment 12 comprises a mounting bar or blade 28 containing a slot 29 and adapted to be mounted on the mounting pad 14 of the power head and held thereon by the cover plate 15 and the nuts 17 on the studs 16. The slot 29 permits longitudinal adjustment of the blade 28 to facilitate engaging and disengaging the drive chain and adjusting its tension. The mounting blade 28 is fixed at its outer end to a housing 30 having an input shaft 32 which carries a sprocket 34 adapted to be connected by a chain to the output sprocket 18 of the power head 10. The housing 30 also contains an output shaft concentric with a tubular extension 36 in which a frame tube 38 is clamped. As shown in FIG. 1, when the conversion implement is in normal operating position, the frame tube 38 extends in a straight stretch diagonally forward and downward from the power head 10, and thence curves downward so that its lower end 40 is in a substantially vertical position.

The lower end 40 of the frame tube 38 carries a rotary cutter head 42, which is rotatably driven by a flexible drive shaft extending through the frame tube 38, as more fully explained below. The upper portion of the frame tube 38 carries a generally D-shaped handle 44 which includes an elongated transverse handhold 45. The handle is formed at its base with a cylindrical seat 47 to fit the frame tube 38 and has two ears engaged by a clamp bolt 43. The handle is thus frictionally clamped to the upper portion of the frame tube 38 in a manner which permits it to be rotated about the axis of that tube 38 as between an upstanding primary or operating position as shown in FIGS. 1 and 3 and a depending position as shown in FIG. 2 in which it serves as a stand or support which cooperates with the guard 26 of the power head 10 for supporting the assembly in a starting position with its rotary cutter 42 elevated, for purposes of starting and adjusting the engine of the power head 10.

The D-handle 44 is desirably made of plastics material of a type which forms a slidable bearing against the surface of the metal frame tube 38, for example, of foamed polypropylene. When clamped on the tube 38, the D-handle is frictionally held firmly in adjusted position for normal operations, but the frictional grip permits it to be manually rotated on the frame tube 38 between its primary and secondary positions.

The details of the preferred housing 30 are shown in FIGS. 4–6. The housing 30 comprises complementary upper and lower die castings 46 and 48 which mate together in the plane of FIG. 4, i.e., on the line 4—4 in FIG. 5. Each casting has a front wall portion 50 shaped to form a semicylindrical seat 52 to receive the outer races of a pair of ball bearings 54 and 56 which support an input shaft 58 in the housing. Each casting also has an end wall portion 60 shaped to form a semicylindrical seat 62 for spaced ball bearings 64 and 66 which support an output shaft 68. Each casting also has a semicylindrical extension 70 having an internal surface coaxial with the seat 62. Over an outer portion of each extension 70, its diametric face is slightly cut away from the plane of separation of the two castings 46 and 48, so that the two semicylindrical extensions form a split sleeve 72 adapted to receive the upper end of the frame tube 38, as shown in FIG. 4. The two halves of the split sleeve 72 are surrounded by a steel strap clamp 74.

The two shafts 58 and 68 are at right angles to each other, and are connected by a pair of bevel gears 76 and 78. The shaft 58 comprises an enlarged outer portion 80 on which the chain sprocket 34 is non-rotatably mounted and held by a cap screw 35. The central portion of the shaft 58 is of reduced diameter and there is a shoulder between such portion and the outer end portion 80. The inner race of the bearing 56 abuts such shoulder, and the inner race of the bearing 54 is held in spaced relation with that of the bearing 56 by a spacer 82. The bevel gear 76 is threaded onto the end of the shaft 58 and clamps the inner races of the bearings and the spacer 82 between itself and the shoulder at the inner end of the outer portion 80. The bevel gear 76 may be locked on its threads by a thread-locking compound such as that available on the market under the trademark "Loc-Tite". The input shaft and its bearings and the bevel gear 78 thus form a self-contained subassembly which may be mounted between the two half castings 46 and 48 when they are assembled. The outer races are clamped in the seats 52 between the two castings, and may be locked therein by means of thread-locking compound. They are fixed against outward movement by abutment of the outer race of the bearing 56 against the fixed end 29 of the mounting blade 28 which is fastened against the outer face of the casting wall portions 50 by cap screws 84. The output shaft 68 is similarly formed with an outer end portion 86 which defines a shoulder at its inner end for abutment by the inner race of the bearing 66. The inner race of the bearing 64 is spaced from that of the bearing 66 by a spacer 88, and is clamped in place by the bevel gear 78 threaded onto the end of the shaft. Again, the gear 78 may be secured on its threads by a thread-locking compound and the outer races 64 and 66 may be secured in their seats 62 by such a compound. A thrust ring 90 is set in a groove in the two castings at the outer face of the bearing 66, to form an abutment for the outer race of that bearing. The outer end of the output shaft 68 is formed with a square socket 92 for the reception of the squared end of a flexible drive shaft 94 mounted in the shaft tube 38 and extending into driving engagement with the rotary cutter head 42, as more fully explained below.

The mounting blade 28 is desirably formed as a laminated assembly of three laminations 95, 96, and 97. Each is offset intermediate its length to dispose the fixed end 29 of the mounting blade in a plane offset from the free end 27 of such blade, and the laminations are formed to define a groove 93 to receive the tangs of the chain teeth, in coplanar alignment with the tang-receiving tooth spaces of the sprocket 34. At the offset in the mounting blade 27, the inner and outer laminations 95 and 97 are formed with stiffening ribs 98 and 99, to reinforce the bent portions of the blade. The laminated mounting blade 28 and the laminated sprocket 34 may both be made by suitably stamping and forming the three laminations, assembling the laminations and spotwelding them together, as at a plurality of spots indicated by the spots 33 shown in FIG. 5. The assemblies are then suitably heat-treated to give them hardness and wear characteristics suited to their use as a support and sprocket for a chain. The chain is similar to a chain saw chain except that it does not include cutting teeth. The chain consists of drive links 114 interconnected by pairs of side plates 116. Each drive link carries an inward extending drive tongue 118, and such tongues ride between the outer side laminations of the mounting blade 28 and sprocket 34, and make driving engagement with the teeth 37 of the sprocket shaped middle lamination of the sprocket 34.

A chain enclosure is formed at the front face of the wall portions 50 of the two castings. Each casting has a front wall 100 joined at its edges to a side wall 102 and an end wall section 104. Such walls define a three-sided enclosure about the sprocket 34 and the chain carried by that sprocket. The front of that sprocket enclosure is closed by a cover 106 having a retaining flange 108 adapted to overlap the side and end walls 102 and 104. The cover 106 desirably extends in the direction of the free end 27 of the mounting blade 28 for a considerable distance beyond the side walls 102 and over that extended portion 107 includes side flaps 110 which overlap the side walls 102 and in effect form extensions of those side walls. The cover 106 is desirably formed of plastics material which is sufficiently stiff and strong to form a satisfactory cover but which is adapted to be cut with a knife so that its extended portions 107 and 110 may be trimmed to fit the particular chain saw power head 10 with which the conversion attachment 12 is assembled. In FIG. 7, the normal, untrimmed end of the cover 106 is shown by the full line A, and the cover is adapted to be trimmed along the V-shaped line B to fit the pointed nose C of the attachment plate of the chain saw power head 10 shown. The cover 106 can be trimmed in various other ways, as desired, for example along the dotted line D to fit a power head having a sloping front face.

The cover 106 is desirably held in place by a snap-on interlocking relationship between the retaining flanges 108 and retaining ribs on the side walls 102 of the sprocket enclosure. Thus, as shown in FIGS. 5 and 6, the side walls 102 are formed with retaining ribs 112 along their upper edges, and the retaining flanges 108 of the cover 106 are formed with mating grooves which receive and fit over such ribs 112 when the cover is in place. The plastics material used for the cover 106 has sufficient resiliency to permit the retaining flanges 108 to be snapped over the ribs 112 of the side walls 102 and to securely but releasably secure the cover 106 in place.

As shown in FIGS. 4 and 8, a flexible drive shaft 94 extends from the output shaft 68 of the bevel gear set coaxially through the frame tube 38 to an arbor shaft 120 mounted at the lower end of the frame tube 38. To support the flexible shaft 94, a sheath tube 122 is mounted concentrically within the frame tube 38. The assembly of the sheath tube 122 and the frame tube 38 is desirably made in accordance with the teachings of my prior application Ser. No. 788,357, filed Apr. 18, 1977. A straight length of sheath tube 122 is first assembled with a lower end spacer 124, an upper end spacer 126, and a length of thick-walled plastic tubing 128 sufficient to form a continuous spacer extending from the lower spacer 124 upward through the bent portion of the frame tube 38 and over a considerable length of the straight portion thereof to provide support for the straight portion of the sheath tube 122. The spacers may be held temporarily in place with wrappings of tape 121. The ends of the sheath tube 122 are then flared to form retaining flanges 123 at the outer faces of the end spacers 124 and 126. This assembly is then inserted in a straight length of frame tube, and the resulting assembly is then bent to the configuration shown in the drawings.

For purposes of mounting the arbor shaft 120 in the lower end of the frame tube 38, such lower end is expanded to form a sleeve 129 to a size sufficient to receive an arbor assembly. The arbor assembly comprises the arbor shaft 120 which has an enlarged upper end defining a shoulder. Two ball bearings 130 and 132 are mounted on the shaft, with the inner race of the bearing 130 abutting against the shoulder on the shaft and with the inner races of the two bearings held in spaced relation by a spacer 131. An elongated hex nut 136 is threaded on the projecting end of the arbor shaft 120 and against the inner race of the bearing 132 to clamp the two bearings and the spacer 130 between itself and the shoulder on the shaft. This arbor assembly is inserted into the expanded lower end 129 of the frame tube 38, and the end edge of the tube is then rolled inward to form a retaining flange 134 against the outer face of the outer race of the bearing 132.

The hexagonal nut 136 on the arbor shaft forms a non-circular drive section which fits into a mating socket in the hub of the rotating cutter head 42 to provide a driving connection between the arbor shaft 120 and that rotary head 42. The upper end of the arbor shaft 120 is formed with a square socket 138 to receive the squared lower end of the flexible drive shaft 94. Such shaft 94 is insertable into the sheath tube 122 from the upper end of the frame shaft assembly, before the frame tube is inserted into the split sleeve 72 to its mounted position as shown in FIG. 4.

The lawn trimmer conversion attachment shown in the drawing is a relatively simple and lightweight but sturdy unit, and is readily attachable to the power heads of most if not all of a considerable number of lightweight chain saws now on the market, including gasoline-engine powered saws as shown in the drawings and electric-motor saws. The mounting blade 28 of the conversion attachment fits the standard saw blade mounting of such chain saws. In such saws, it is conventional to mount the saw blade for ready removal and replacement, and the attachment of the present conversion attachment requires only the removal of the saw blade in the usual manner, and its replacement with the mounting blade 28. The slot 29 of the mounting blade 28 is of sufficient length to permit the driving sprocket 18 and the driven sprocket 34 to be brought close enough to receive the chain. The mounting blade 28 is then moved outward sufficiently to tighten the chain, and the mounting is secured by tightening the nuts on the studs 116. The frame tube 38 of the lawn trimmer is securely clamped in the split sleeve 72 of the housing 30, but is readily rotatable therein to angularly adjust the position of the frame tube and the rotary cutter head 42 to suit the convenience of the operator and to adapt the device for different operations, for example, for operating the cutter head in a horizontal plane for mowing and trimming, or for operating such head in an inclined plane for edging and sweeping. The D-handle 44 is readily adjustable axially along the upper end of the frame tube 38 by loosening its clamping bolt 43 and sliding it lengthwise of the frame tube. The handle primarily serves as a convenient and effective handle for the operator during operation of the device, but may easily be rotated manually to a depending secondary position in which it serves as an effective stand for the assembly, as shown in FIG. 2, for purposes of starting the engine of the power head 10 or of adjusting its operation under conditions in which the rotary cutter head 42 should be free to rotate.

The conversion attachment extends the utility of the chain saw power head and provides a lawn trimmer or the like at substantially less cost than purchase of a separate unit, and it provides a highly effective combination which serves a variety of purposes. The attachment may be a lightweight unit, as shown, which is adapted to be mounted on a lightweight power saw and to receive only a lightweight rotary cutter head of the type which uses one or more flexible monofilament lines as cutting elements. Alternatively, the conversion attachment may be of heavier construction and adapted to be mounted on a heavier chain saw and may be provided with a number of different implements on its arbor shaft, such as a rotary brush cutter or rotary saw, a rotary trimmer head of the type here shown, a cultivating implement as in Hoff U.S. Pat. No. 2,888,994, and any of various tools used to clear fire lanes and the like in forest fire control operations.

I claim:

1. A conversion attachment for forming a conversion assembly with a chain saw power head having a saw bar mounting pad and a drive sprocket on a sprocket shaft, comprising an attachment mounting blade adapted to be received on the chain bar mounting pad, a housing carried by such mounting blade, an input shaft mounted in said housing for rotation on an axis parallel to the chain saw sprocket shaft, a sprocket on said input shaft adapted to be connected to the chain saw sprocket by a chain, an output shaft mounted in said housing for rotation on an axis at an angle to said input shaft, and gear means interconnecting said input and output shafts, an elongated frame member for a ground implement mounted to said housing and extending therefrom and a cutter head operatively supported by said frame member at the opposite end thereof, a transmission shaft connecting said output shaft to drive said cutter head, the chain saw conversion assembly having a normal manually-carried operating position in which the frame shaft extends forward and downward to a position close to the ground, and said cutter head being a lawn trimmer head or the like having a cutting element in the form of a flexible line of plastics material extending freely from the periphery of the rotary cutter head and adapted to operate as a flail when the head is driven at operating speed, said frame shaft being a tube which has an upper straight section and a lower bent section, a head-supporting arbor shaft being mounted in a bearing at the lower end of the frame tube, and said transmission shaft being a flexible drive shaft extending through the frame tube, said housing carried by said mounting blade including a split sleeve coaxial with the output shaft of the housing, and the upper end of said frame tube being received in said split sleeve and clamped therein, the tube being rotatably adjustable in the split sleeve to vary the aspect of the bent portion of the frame tube and the cutting plane of the head relative to said normal operating position of the assembly.

2. A conversion attachment as in claim 1 with the addition of a handle mounted on said frame tube adjacent the upper end thereof, and having a transverse handhold, said handle being rotatable about the frame tube between a primary position in which the handhold is above the frame tube for grasping by the hand of an operator, and a secondary position in which the handhold is below the frame tube and the handle forms a stand for supporting the conversion assembly on a flat surface.

3. A conversion attachment as in claim 2 in which the handle is mounted on said frame tube by a clamp which frictionally grips the frame tube with a grip sufficient to hold the handle for use in its two positions but adapted to be overcome by manual force exerted to rotate the handle about the frame tube.

4. A conversion attachment for forming a conversion assembly with a chain saw power head having a saw bar mounting pad and a drive shaft, comprising an attachment mounting blade adapted to be received on the bar mounting pad of the chain saw power head, a housing carried by such mounting blade, an input shaft mounted in said housing for rotation on an axis parallel to the chain saw sprocket shaft, a driven rotor on said input shaft adapted to be connected to the chain saw drive shaft by an endless drive element, an output shaft mounted in said housing for rotation on an axis at an angle to said input shaft, and gear means interconnecting said input and output shafts, an elongated frame member for a ground implement mounted to said housing and extending forward and downward therefrom to a cutter head position, said frame member having an upper straight portion coaxial with said output shaft and having a lower bent portion, a cutter head operatively supported at the lower end of said frame member on an axis at an angle to said upper portion, a transmission shaft extending through said frame member and connecting said output shaft to drive said cutter head, a handle mounted to said frame shaft adjacent the upper end thereof and rotationally adjustable thereon in a position relative to a handle of the chain saw such that the assembly is adapted to be manually carried by such handles in a normal operating position with the frame member extending forward and downward to dispose the cutter head adjacent the ground, said frame shaft handle including a transverse handhold and being movable about the frame shaft between a primary position in which the handhold is above the frame shaft for grasping by the hand of an operator, and a secondary position in which the handhold is below the frame shaft and the handle forms a stand for supporting the conversion assembly on a flat surface with the cutter head clear of such flat surface.

5. A conversion attachment for forming a conversion assembly with a chain saw power head having a saw bar mounting pad and a drive sprocket on a sprocket shaft, comprising
an attachment mounting blade adapted to be received on the bar mounting pad,
a housing carried by such mounting blade,
an input shaft mounted in said housing for rotation on an axis parallel to the chain saw sprocket shaft, a sprocket on said input shaft adapted to be connected to the chain saw sprocket by a chain,
an output shaft mounted in said housing for rotation on an axis at an angle to said input shaft, and gear means interconnecting said input and output shafts,
an elongated frame member for a ground implement mounted to said housing and extending therefrom to a cutter head position,
a cutter head operatively supported by said frame member in such position,
and a transmission shaft connecting said output shaft to drive said cutter head,
said housing including enclosure walls at the sides and front of the input shaft sprocket, and a removable cover on such walls, the cover extending rearward in the direction of the mounting blade so as to form a guard over the chain between the sprockets, said cover being made of plastics material adapted to be trimmed, as with a knife, to conform to the configuration of the chain saw power head to which the conversion attachment is assembled.

6. A conversion attachment for forming a conversion assembly with a chain saw having a drive sprocket on a sprocket shaft and a mounting pad for supporting a saw bar coplanar with such sprocket, comprising
an attachment mounting blade having a mounting portion adapted to be received on the bar mounting pad of a chain saw, and having a displaced portion displaced from the plane of said mounting portion,
a gear housing carried by the displaced portion of said mounting blade, said housing comprising upper and lower halves having front wall portions defining complementary semicylindrical seats for an input shaft bearing and having end wall portions defining complementary semicylindrical seats for an output shaft bearing on an axis at an angle to the axis of the input shaft,
bearings mounted in said seats, and input and output shafts in said bearings, the housing halves being clamped together to clamp the bearings in the seats,
said housing halves also having sleeve segments projecting from said end wall portions in coaxial relation with the output shaft,
a driven sprocket on said input shaft in position to be coplanar with and operatively connected to the chain saw drive sprocket by a chain,
a frame tube having its upper end engaged with said sleeve segments and extending therefrom to a cutter head position,
and a cutter head rotatably supported by said frame tube in such cutter head position,
and a transmission shaft extending through the frame tube and connecting the output shaft to drive the cutter head.

7. A conversion attachment as in claim 6 in which said mounting portion of the mounting blade is formed at its edges to provide guideways for guiding the chain in the common plane of the chain saw drive sprocket and said driven sprocket.

8. A ground trimmer attachment for a chain saw power head having a drive shaft disposed transversely thereof, a saw bar mounting pad extending longitudinally thereof, a rear handle extending rearward of said drive shaft in a longitudinal plane offset inward from said mounting pad toward the center plane of the power head, and a bottom support means by which the power head may be supported on a supporting surface, said attachment comprising
a mounting blade adapted to be mounted to said mounting pad,
a gear housing carried by said blade in position to extend inward therefrom in front of said power head, said housing having a transverse input shaft for connection with a rotor on said drive shaft of the power head by an endless drive element, and having a longitudinal output shaft offset inward from said mounting blade so as to be disposed in or adjacent the plane of said rear handle,
a frame shaft mounted to said housing and having its upper end aligned with said output shaft, such frame shaft being arranged to extend forward and downward from the gear housing and having a cutter head at its lower end,
a transmission shaft connecting the output shaft to drive the cutter head,
a transverse handle mounted on said attachment in position to be disposed forward of said power head, said handle including a portion adapted for engagement with a supporting surface and in cooperation with support means of the power head to support the assembly on the ground or other supporting surface with the cutter head elevated for free rotation above such surface,
whereby a chain saw power head with such attachment mounted thereto is adapted to be carried by an operator with his two hands holding said handles, with the body of the power head substantially therebetween and with the frame shaft extending forward and downward to dispose the cutter head for cutting operation adjacent the ground, and is adapted to be supported on the ground or other flat surface by such power head support means and handle portion with the cutter free to rotate as for purposes of starting the power head.

9. A ground trimmer attachment for a chain saw power head having a drive sprocket on a transverse drive shaft, a saw bar mounting pad for receiving a longitudinally extending saw bar, handle means offset inward from the mounting pad, and bottom supporting means for supporting the power head on the ground or other supporting surface, comprising a mounting blade adapted to be mounted to said mounting pad, an angle drive housing carried by said blade and having a driven rotor on a transverse input shaft adapted to be connected by an endless drive element rotor on said drive shaft, and said housing having a longitudinal output shaft offset inward from said mounting blade, a frame shaft mounted to said housing with its upper end aligned with said output shaft, said frame shaft extending forward and downward and having a cutter head at its lower end, the frame shaft and cutter head being so constructed and arranged that the head would engage the ground in the absence of support other than the supporting means of the power head, and means mounted on the frame shaft and having ground engaging means operable in conjunction with supporting means on the power head to support the assembly in stable position on the ground or other supporting surface with the power head resting on the ground and with the cutter head elevated in clearance relation with the ground and free to rotate as for purposes of starting the power head of the assembly.

10. A conversion attachment for assembly with a chain saw power head having a drive sprocket on a transverse drive shaft and a saw bar mounting pad for mounting a saw bar in coplanar relation with the drive sprocket, such sprocket being formed and constructed to drive a saw chain having drive links connected by pairs of side plates and having inward extending drive lugs, comprising a mounting blade having a mounting portion for reception on the mounting pad of the power head in the plane of the drive sprocket and having a displaced portion displaced inward from the plane of said mounting portion, an angle drive housing attached to said displaced portion and having a transverse input shaft and a driven sprocket thereon coplanar with the mounting portion of the mounting blade so as to be coplanar with the drive sprocket when assembled with the power head, said angle drive housing also having a longitudinal output shaft, offset inward from the mounting portion of the mounting blade, a frame tube extending forward from said drive housing and having a cutter head at its end drivingly connected to said output shaft, said mounting portion being formed at its edges with guideways for guiding the chain in the common plane of the power head drive sprocket and the driven sprocket.

11. A conversion attachment as in claim 10, in which said mounting blade comprises a laminated assembly having side layers with guideway edges for guiding the side plates of the chain and a groove therebetween for receiving and guiding the drive lugs of the drive links.

12. A conversion attachment as in claim 11 in which the mounting blade displaced portion is offset from the mounting portion and connected thereto by an angled portion, the side layers of the laminated assembly having oppositely outwardly deformed rib portions extending longitudinally across said angled portion to reinforce the same.

13. A conversion attachment as in claim 11 in which the driven sprocket is a laminated assembly having side layers with circular edges to support the side plates of the chain and an inner layer formed to provide tooth spaces and teeth to receive and drive the drive lugs of the drive links.

14. A conversion attachment for forming a conversion assembly with a chain saw power head having a saw bar mounting pad and a drive shaft extending normal thereto, comprising an attachment mounting blade adapted to be received on the bar mounting pad, a housing carried by such mounting blade, an input shaft mounted in said housing for rotation on an axis parallel to the chain saw sprocket shaft, a rotor on said input shaft adapted to be connected to a rotor on the chain saw drive shaft by an endless drive element, an output shaft mounted in said housing for rotation on an axis at an angle to said input shaft, and gear means interconnecting said input and output shafts, an elongated frame member for a ground implement mounted to said housing and extending therefrom to a cutter head position, a cutter head operatively supported by said frame member in such position, and a transmission shaft connecting said output shaft to drive said cutter head, a cover removably mounted on said housing, said cover and housing including enclosure walls at the sides and front of the input shaft rotor and extending rearward in the direction of the mounting blade so as to form a guard over the endless drive element between the rotors, said cover being made of plastics material adapted to be trimmed, as with a knife, to conform to the configuration of the chain saw power head to which the conversion attachment is assembled.

15. A conversion attachment for forming a conversion assembly with a chain saw having a drive rotor on a sprocket shaft and a mounting pad for supporting a saw bar coplanar with such rotor, comprising an attachment mounting blade having a mounting portion adapted to be received on the bar mounting pad of a chain saw, and having a displaced portion displaced from the plane of said mounting portion, a gear housing carried by the displaced portion of said mounting blade, said housing comprising upper and lower halves having front wall portions defining complementary semicylindrical seats for an input shaft bearing and having end wall portions defining complementary semicylindrical seats for an output shaft bearing on an axis at an angle to the axis of the input shaft, bearings mounted in said seats, and input and output shafts in said bearings, the housing halves being clamped together to clamp the bearings in the seats, said housing halves also having sleeve segments projecting from said end wall portions in coaxial relation with the output shaft, a driven rotor on said input shaft in position to be coplanar with and operatively connected to a rotor on the chain saw drive shaft by an endless drive element, a frame tube having its upper end engaged with said sleeve segments and extending therefrom to a cutter head position, and a cutter head rotatably supported by said frame tube in such cutter head position, and a transmission shaft extending through the frame tube and connecting the output shaft to drive the cutter head.

* * * * *